(12) United States Patent
Zeiler et al.

(10) Patent No.: US 10,639,567 B1
(45) Date of Patent: May 5, 2020

(54) SUPPORT AND DRAINAGE MATERIAL, FILTER, AND METHOD OF USE

(71) Applicant: Pall Corporation, Port Washington, NY (US)

(72) Inventors: Martin Zeiler, Schwaebisch Gmuend (DE); John P. Miller, Cortland, NY (US)

(73) Assignee: PALL CORPORATION, Port Washingto, NY (US)

( * ) Notice: Subject to any disclaimer, the term of this patent is extended or adjusted under 35 U.S.C. 154(b) by 0 days.

(21) Appl. No.: 16/169,537

(22) Filed: Oct. 24, 2018

(51) Int. Cl.
*B01D 29/21* (2006.01)
*B01D 46/52* (2006.01)
*B01D 46/10* (2006.01)
*B01D 39/10* (2006.01)
*B01D 39/16* (2006.01)

(52) U.S. Cl.
CPC ......... *B01D 29/21* (2013.01); *B01D 46/103* (2013.01); *B01D 46/522* (2013.01); *B01D 46/523* (2013.01); B01D 39/10 (2013.01); B01D 39/16 (2013.01); B01D 2201/127 (2013.01); B01D 2265/06 (2013.01)

(58) Field of Classification Search
CPC ...... B01D 27/06; B01D 29/07; B01D 29/016; B01D 29/031; B01D 29/21; B01D 29/232; B01D 29/333; B01D 29/353; B01D 46/521; B01D 46/523; B01D 2201/0407; B01D 2201/0415; B01D 2201/127

USPC ....................................................... 210/493.1
See application file for complete search history.

(56) References Cited

U.S. PATENT DOCUMENTS

| | | | |
|---|---|---|---|
| 3,280,985 A * | 10/1966 | Czerwonka | B01D 29/07 210/489 |
| 5,263,792 A | 11/1993 | Davis et al. | |
| 5,543,047 A | 8/1996 | Stoyell et al. | |
| 5,552,048 A | 9/1996 | Miller et al. | |
| 6,786,013 B2 | 9/2004 | Coulton | |
| 2004/0131423 A1 | 7/2004 | Ianniello et al. | |
| 2010/0236204 A1* | 9/2010 | Bouhanna | B01D 46/0005 55/494 |

FOREIGN PATENT DOCUMENTS

| | | |
|---|---|---|
| GB | 1056263 A | 1/1967 |
| WO | WO 1996/030105 A1 | 10/1996 |
| WO | WO 2005/082485 A1 | 9/2005 |

OTHER PUBLICATIONS

European Patent Office, Extended European Search Report in in counterpart European Application No. 19201907.3, dated Mar. 6, 2020.

* cited by examiner

Primary Examiner — Benjamin M Kurtz
(74) Attorney, Agent, or Firm — Leydig Voit & Mayer, Ltd.

(57) ABSTRACT

Support and drainage elements, filter including the elements, and methods of use are disclosed.

16 Claims, 8 Drawing Sheets

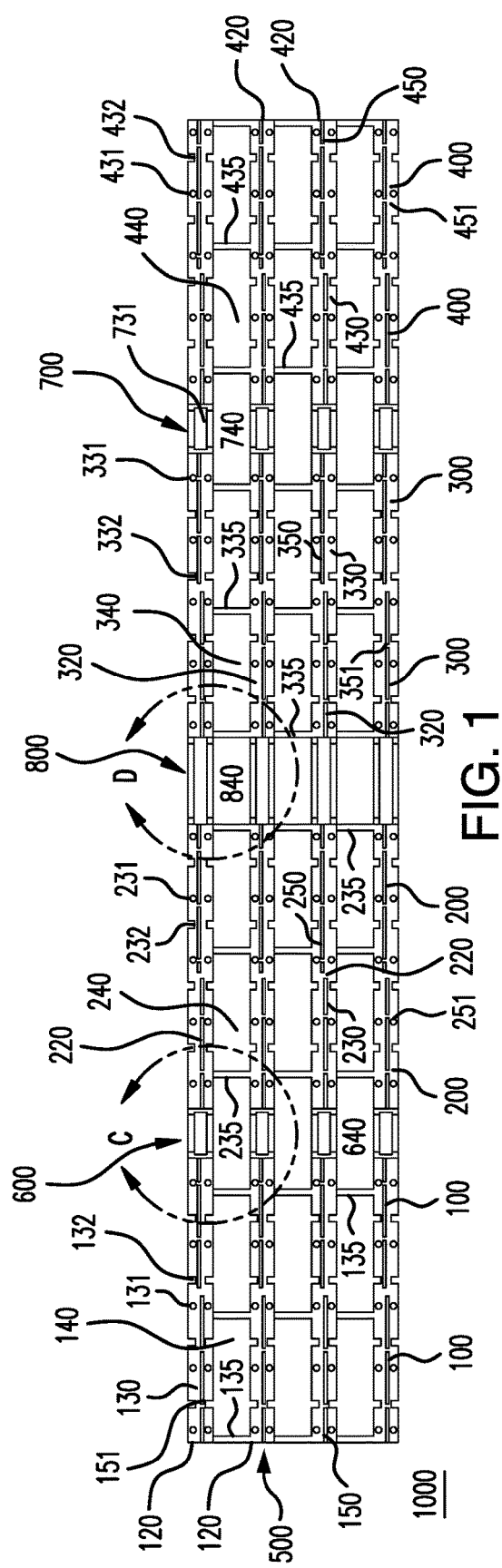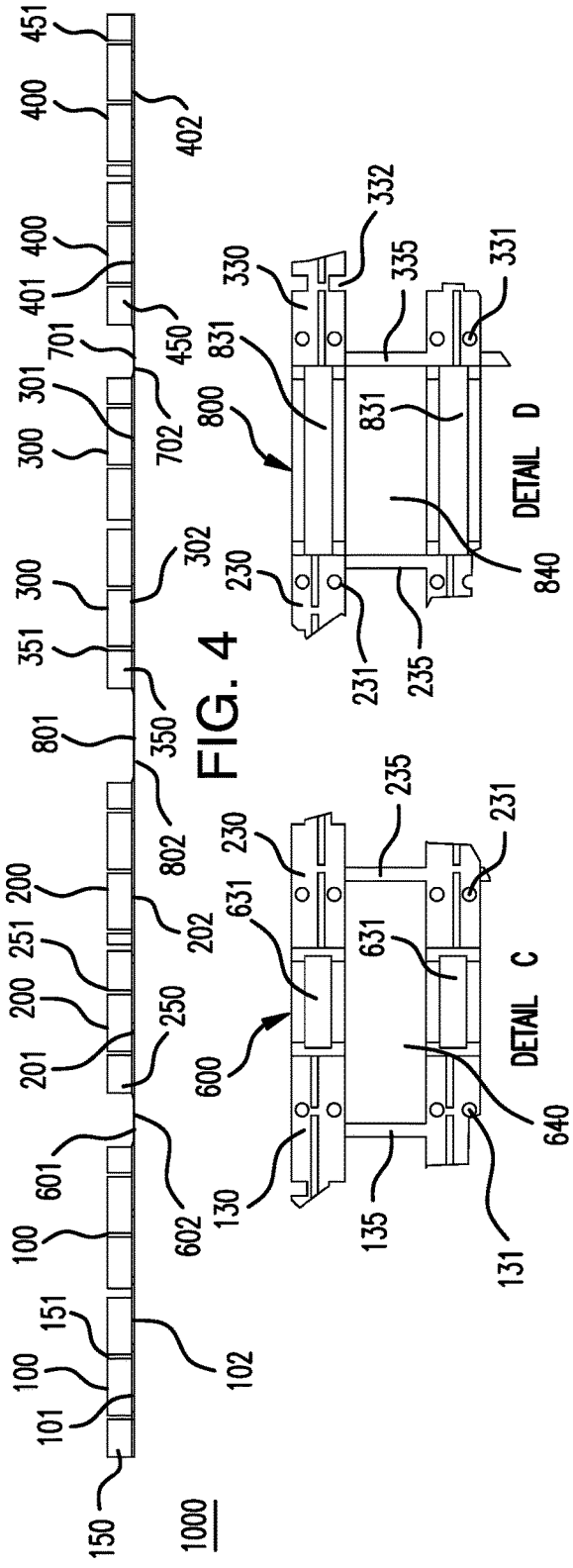

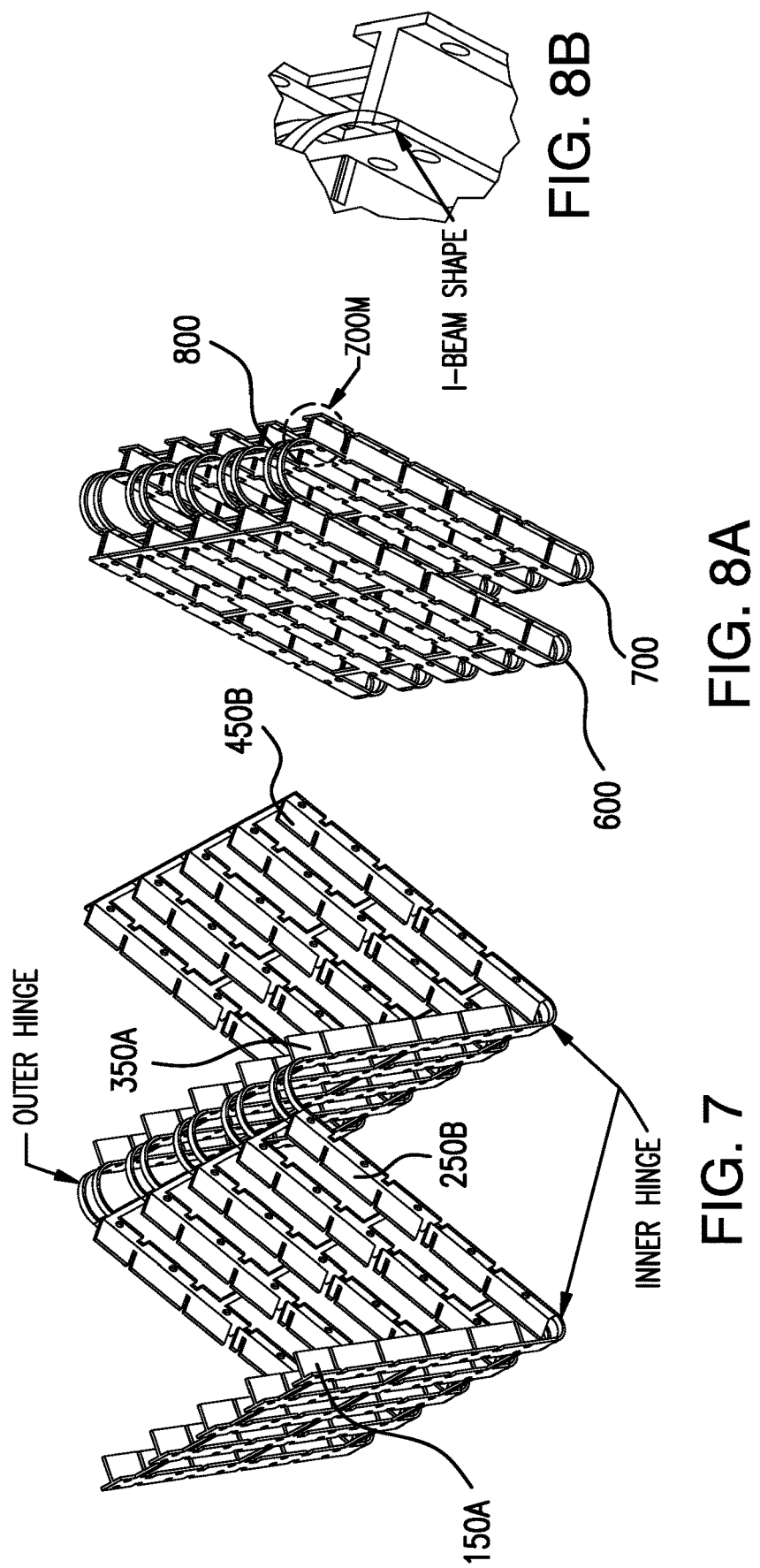

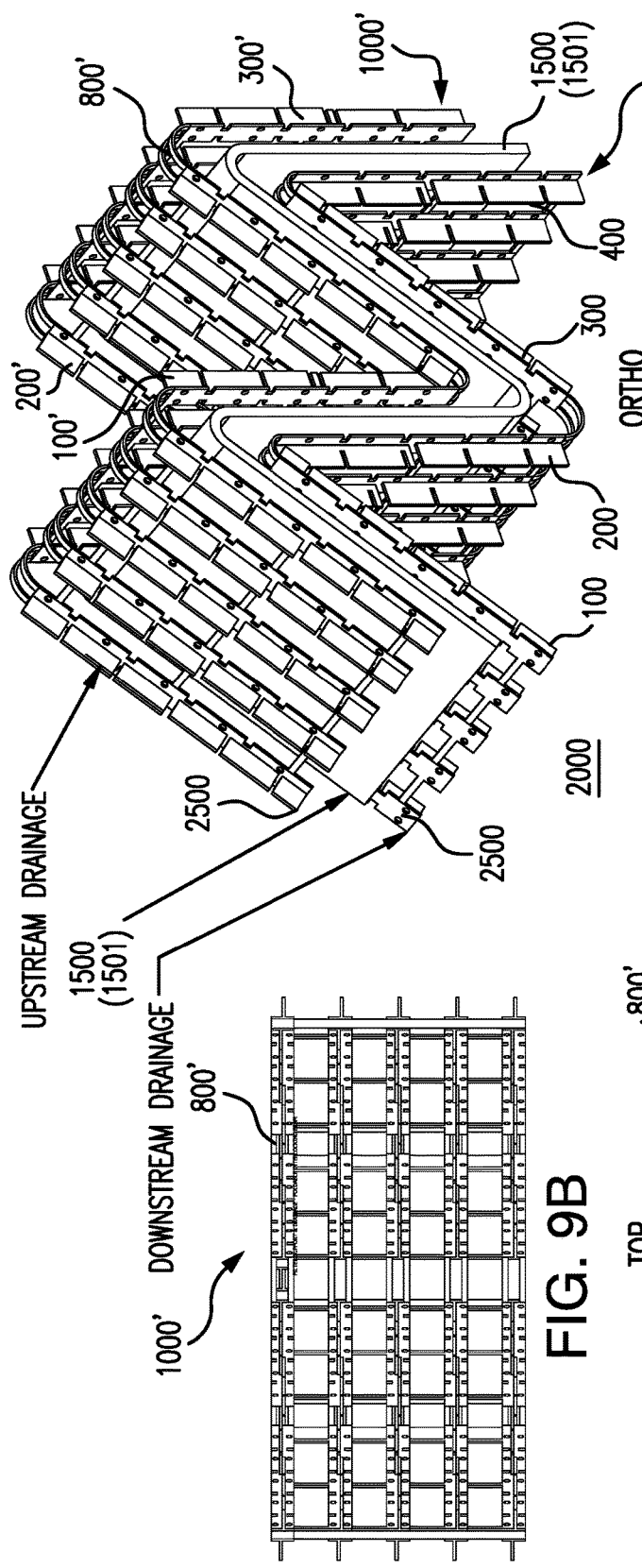
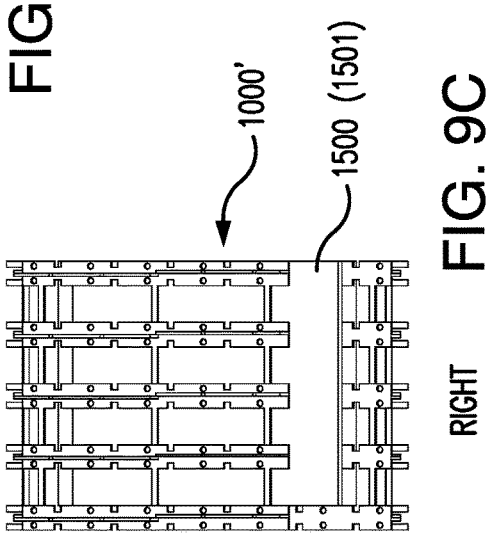
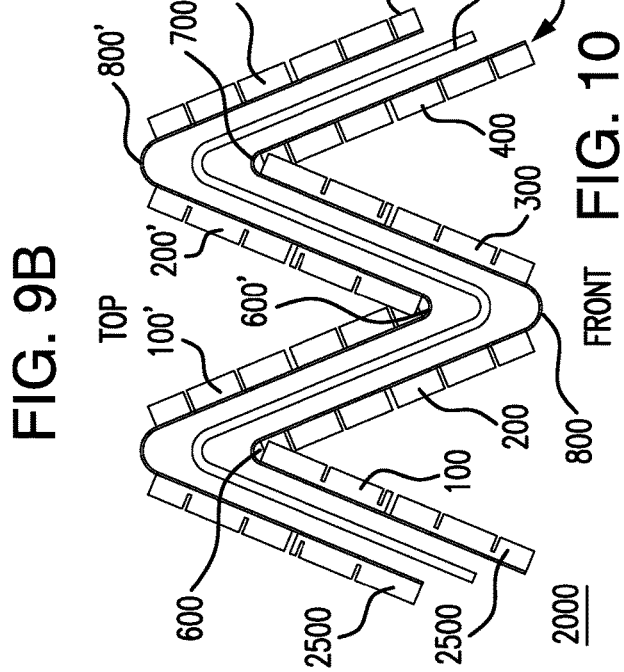

DETAIL M

DETAIL A

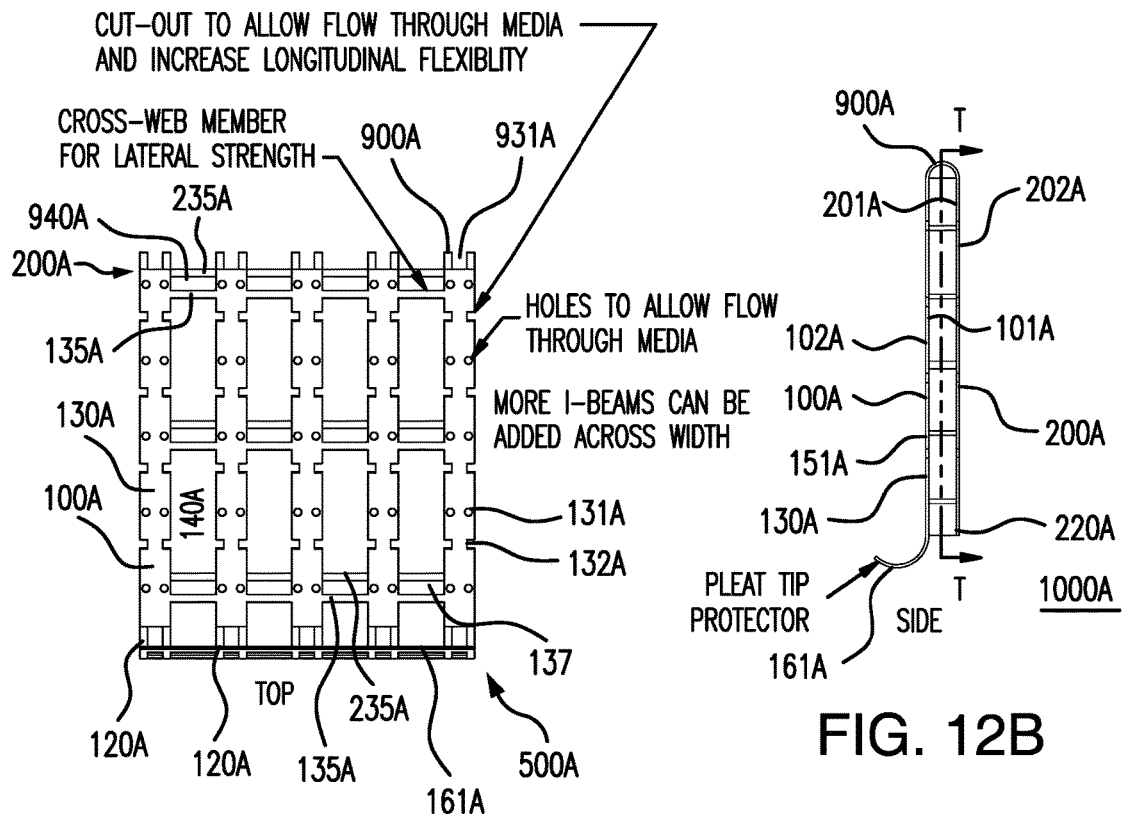
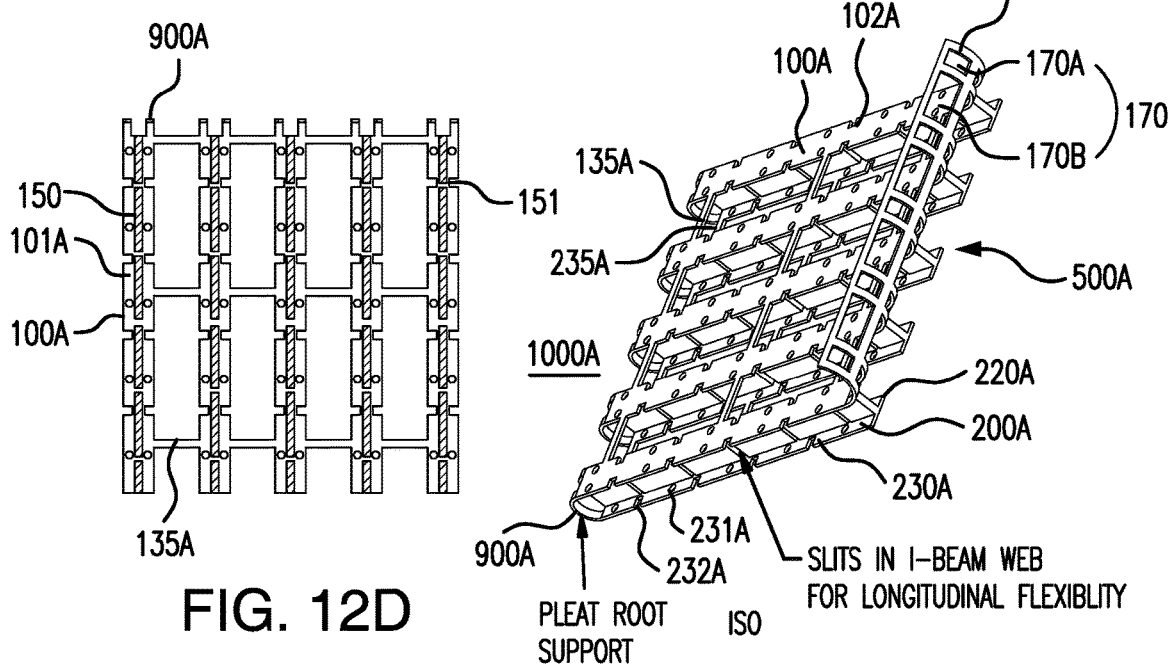
FIG. 12C
FIG. 12B
FIG. 12D
FIG. 12A

SUPPORT AND DRAINAGE MATERIAL, FILTER, AND METHOD OF USE

BACKGROUND OF THE INVENTION

Support and drainage elements such as meshes (also called screens or netting) are utilized in a number of filtration applications, wherein the support and drainage ("S&D") elements are arranged upstream and/or downstream of porous filter media. The S&D elements have much larger openings than the pores of the filter media, and provide support to the filter media and/or provide good drainage for the filter media.

However, there is a need for improved support and drainage elements.

The present invention provides for ameliorating at least some of the disadvantages of the prior art. These and other advantages of the present invention will be apparent from the description as set forth below.

BRIEF SUMMARY OF THE INVENTION

An embodiment of the invention provides a support and drainage element comprising a frame comprising (a) at least one first section having a first major surface and a second major surface, the first major surface and the second major surface comprising rows of parallel flanges, the rows of parallel flanges being spaced apart from each other by apertures passing through the first major surface and the second major surface, the at least one first section further comprising a plurality of apertures and/or slots passing through the parallel flanges, the at least one first section having a plurality of beams arranged in parallel and projecting upwardly from, and perpendicular to, the first major surface, wherein each beam includes at least one slot and/or aperture therethrough. In an embodiment, the support and drainage element is included in an embodiment of a support and drainage element system, wherein the system further comprises (b) at least one second section having a first major surface and a second major surface, the first major surface and the second major surface comprising rows of parallel flanges, the rows of parallel flanges being spaced apart from each other by apertures passing through the first major surface and the second major surface, the at least one second section further comprising a plurality of apertures and/or slots passing through the parallel flanges, the at least one second section having a plurality of beams arranged in parallel and projecting upwardly from, and perpendicular to, the first major surface, wherein each beam includes at least one slot and/or aperture therethrough.

In another embodiment, a support and drainage element is provided, comprising a frame comprising (a) at least one first section having a first major surface and a second major surface, the first major surface and the second major surface comprising rows of parallel flanges, the rows of parallel flanges being spaced apart from each other by apertures passing through the first major surface and the second major surface, the at least one first section further comprising a plurality of apertures and/or slots passing through the parallel flanges, the at least one first section having a plurality of beams arranged in parallel and projecting upwardly from, and perpendicular to, the first major surface, wherein each beam includes at least one slot and/or aperture therethrough; (b) at least one second section having a first major surface and a second major surface, the first major surface and the second major surface comprising rows of parallel flanges, the rows of parallel flanges being spaced apart from each other by apertures passing through the first major surface and the second major surface, the at least one second section further comprising a plurality of apertures and/or slots passing through the parallel flanges, the at least one second section having a plurality of beams arranged in parallel and projecting upwardly from, and perpendicular to, the first major surface, wherein each beam includes at least one slot and/or aperture therethrough; and (c) a first foldable hinge having a first major surface and a second major surface and at least one aperture passing through the first major surface and the second major surface, wherein the first section is connected to the second section by the first foldable hinge; (i) wherein when the first foldable hinge is folded, the plurality of beams on the first section and the plurality of beams on the second section align side by side touching each other. In an embodiment, the support and drainage element further comprises (d) at least one third section having a first major surface and a second major surface, the first major surface and the second major surface comprising rows of parallel flanges, the rows of parallel flanges being spaced apart from each other by apertures passing through the first major surface and the second major surface, the at least one third section further comprising a plurality of apertures and/or slots passing through the parallel flanges, the at least one third section having a plurality of beams arranged in parallel and projecting upwardly from, and perpendicular to, the first major surface, wherein each beam includes at least one slot and/or aperture therethrough; (e) at least one fourth section having a first major surface and a second major surface, the first major surface and the second major surface comprising rows of parallel flanges, the rows of parallel flanges being spaced apart from each other by apertures passing through the first major surface and the second major surface, the at least one fourth section further comprising a plurality of apertures and/or slots passing through the parallel flanges, the at least one fourth section having a plurality of beams arranged in parallel and projecting upwardly from, and perpendicular to, the first major surface, wherein each beam includes at least one slot and/or aperture therethrough; and (f) a second foldable hinge having a first major surface and a second major surface and an aperture passing through the first major surface and the second major surface, wherein the third section is connected to the fourth section by the second foldable hinge, and (g) a third foldable hinge having a first major surface and a second major surface and at least one aperture passing through the first major surface and the second major surface, wherein the third section is connected to the second section by the third foldable hinge; (ii) wherein when the second foldable hinge is folded, the plurality of beams on the third section and the plurality of beams on the fourth section align side by side touching each other.

Another embodiment of a support and drainage element comprises a frame comprising (a) a first section having a first major surface and a second major surface, the first major surface and the second major surface comprising rows of parallel flanges, the rows of parallel flanges being spaced apart from each other by apertures passing through the first major surface and the second major surface, the first section further comprising a plurality of apertures and/or slots passing through the parallel flanges, the at least one first section having a plurality of non-offset beams arranged in parallel and projecting upwardly from, and perpendicular to, the first major surface, wherein each beam includes at least one slot and/or aperture therethrough; the beams being connected to (b) a second section having a first major surface and a second major surface, the first major surface and the second major surface comprising rows of parallel flanges, the rows of parallel flanges being spaced apart from each other by apertures passing through the first major surface and the second major surface, the second section further comprising a plurality of apertures and/or slots passing through the parallel flanges; the support and drainage element further comprising parallel rows of spaced apart curved connectors each having a first major surface and a second major surface and at least one aperture passing through the first major surface and the second major surface, wherein a first section is connected to a second section by the curved connectors.

In some embodiments, the support and drainage element further comprises a curved extension connected to the at least one first section and/or the at least one second section, the curved extension including a plurality of apertures.

In some embodiments, the support and drainage element, when folded, the plurality of beams on the first section contact the first major surface of the second section, the plurality of beams on the second section contact the first major surface of the first section, the plurality of beams on the third section contact the first major surface of the fourth section, and the plurality of beams on the fourth section contact the first major surface of the third section.

Embodiments of the support and drainage element can include at least one additional first section, at least one additional second section, and at least one additional first foldable hinge connecting the at least one additional first section to the at least one additional second section, and at least one additional third foldable hinge, connecting the additional first section to the at least one fourth section.

A filter arrangement according to an embodiment of the invention comprises a pleated porous filter medium having an upstream surface and a downstream surface and having a plurality of pleats, each pleat having an upstream surface and a downstream surface; and, an embodiment of the support and drainage element system, wherein the first section or the second section contacts the upstream surface or the downstream surface of a pleat, and the plurality of beams on the first section and the plurality of beams on the second section align side by side touching each other.

A filter arrangement according to another embodiment of the invention comprises a pleated porous filter medium having a plurality of pleats, each pleat having an upstream surface and a downstream surface; and, at least one support and drainage element according to an embodiment of the invention, wherein the first foldable hinge is folded and the upstream surface or the downstream surface of a pleat is in contact with the second major surface of the first section and the second major surface of the second section.

In another embodiment, a support and drainage element system is provided, comprising first and second separate support and drainage elements according to an embodiment of the invention, the first separate support and drainage element comprising an upstream support and drainage element, the second separate support and drainage element comprising a downstream support and drainage element.

In yet another embodiment, a support and drainage element system comprises a plurality of first and second separate support and drainage elements according to an embodiment of the invention, each of the plurality of first and second separate support and drainage elements comprising a separate insert suitable for use upstream and/or downstream of an individual pleat of a pleated porous filter medium having a plurality of pleats.

A filter system according to an embodiment of the invention comprises a pleated porous filter comprising at least one pleated porous filter medium having a plurality of pleats, and an embodiment of the support and drainage element system, wherein the pleated porous filter is arranged between the upstream support and drainage element and the downstream support and drainage element.

A filter system according to another embodiment of the invention comprises a pleated porous filter comprising a pleated porous filter medium having a plurality of pleats, and an embodiment of the support and drainage element system, wherein each pleat has a separate support and drainage element comprising an insert arranged upstream and downstream of the pleat.

Embodiments of methods of filtering fluid are also provided, wherein the method comprises passing a fluid through an embodiment of the filter system, including passing fluid through the upstream support and drainage element, the pleated porous filter, and the downstream support and drainage element, or passing a fluid through an embodiment of the filter system, including passing fluid through the upstream support and drainage element inserts, the pleats, and the downstream support and drainage element inserts.

BRIEF DESCRIPTION OF THE SEVERAL VIEWS OF THE DRAWING(S)

FIG. 1 is a top view of an embodiment of the support and drainage element, showing pluralities of sections, hinges with apertures, rows of spaced apart parallel flanges wherein the flanges have apertures, and offset beams wherein the beams have slots.

FIG. 2 is a view of detail C of the embodiment of the support and drainage element shown in FIG. 1, showing part of a first section connected to part of a second section by a first foldable hinge, the sections having offset beams.

FIG. 3 is a view of detail D of the embodiment of the support and drainage element shown in FIG. 1, showing part of a third section connected to part of a fourth section by a second foldable hinge, the sections having offset beams.

FIG. 4 is a front view of the embodiment of the support and drainage element shown in FIG. 1.

FIG. 7 is a perspective view of the embodiment of the support and drainage element shown in FIG. 1, wherein the element is partially folded.

FIG. 8A is a perspective view of the embodiment of the support and drainage element shown in FIG. 1, wherein the element is completely folded, showing offset beams from different sections aligned side by side touching each other, FIG. 8B is an enlarged view of the zoom detail shown in FIG. 8A, showing a general "I beam" shape formed when offset beams from different sections are aligned side by side touching each other.

FIG. 9A is perspective view of a filter according to another embodiment of the present invention, wherein support and drainage elements are arranged upstream and downstream of a pleated porous filter element, and the support and drainage elements are partially folded, FIG. 9B shows a top view of FIG. 9A, and FIG. 9C shows a right side view of FIG. 9A.

FIG. 10 is a side view of the embodiment of the filter shown in FIG. 9.

Figure 11A:
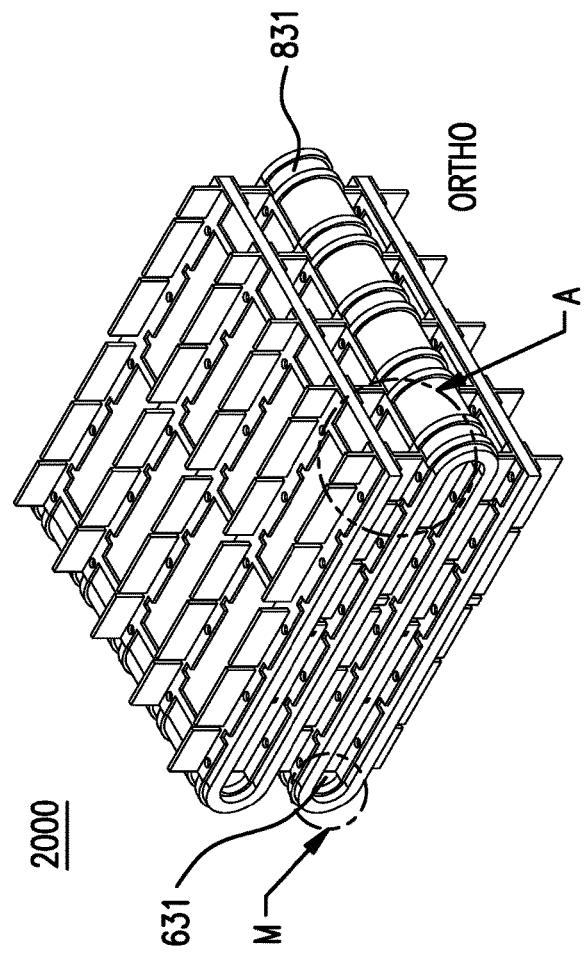
Figure 11C:
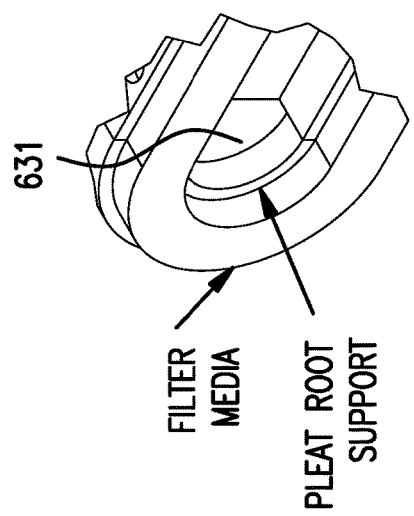
Figure 11B:
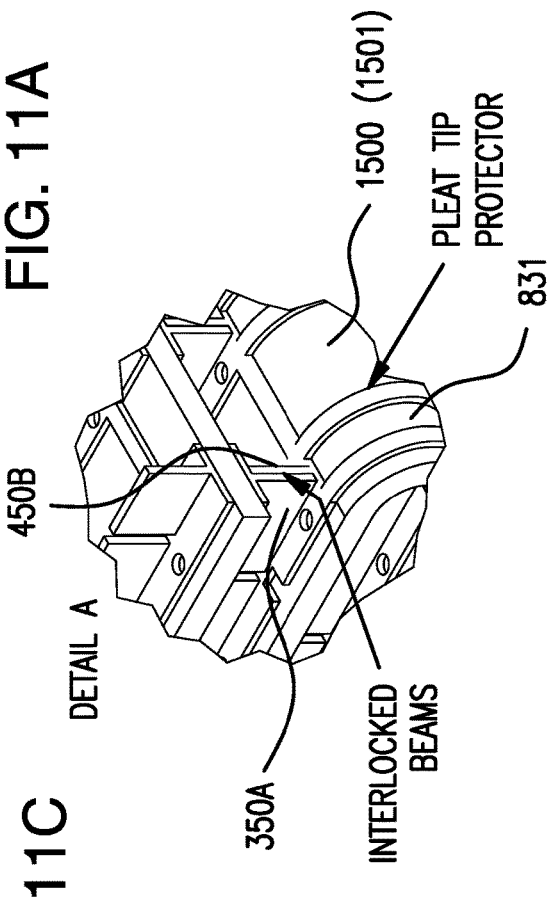

FIG. 11A is a perspective view of the embodiment of the filter shown in FIG. 9, wherein the support and drainage elements are fully folded, and showing a first hinge providing a filter pleat root support and a second hinge providing a filter pleat tip protector, FIG. 11B is an enlarged view of detail A shown in the embodiment of the filter shown in FIG. 11A, showing offset beams from different sections aligned side by side touching each other, and FIG. 11C is an enlarged view of detail M showing the pleat root support in FIG. 11A.

FIG. 12A is an isometric view of another embodiment of the support and drainage element, showing part of a first section connected to part of a second section, wherein the support and drainage element is an insert, the element further comprises a curved extension connected to a first section, the curved extension including a plurality of apertures; FIG. 12B shows a side view of the element shown in FIG. 12A, FIG. 12C shows a top view, and FIG. 12D shows a view of section T-T of the element shown in FIG. 12B.

Figure 13A:
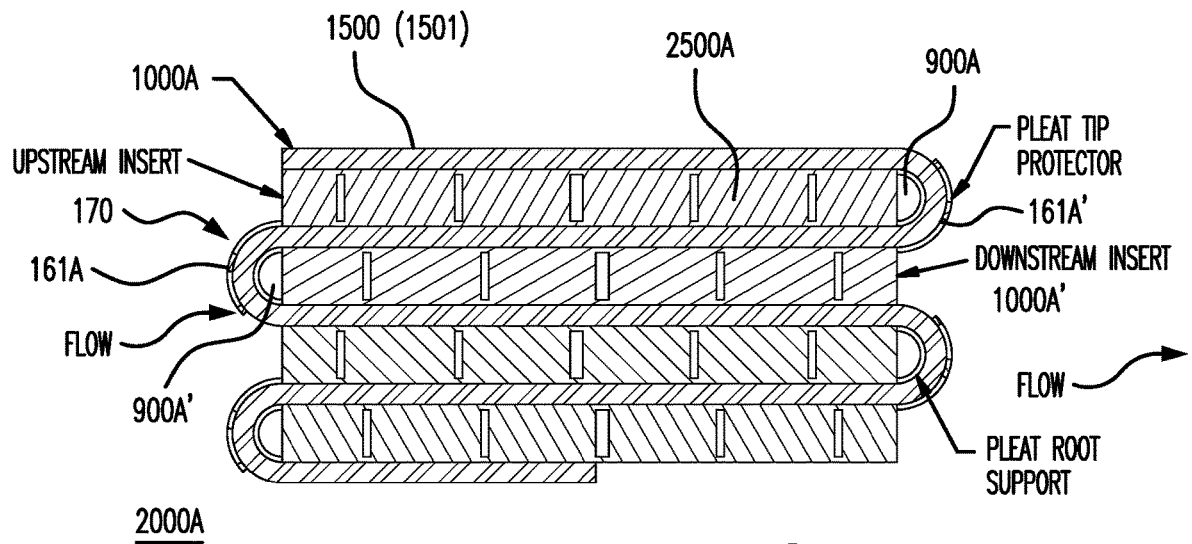
Figure 13B:
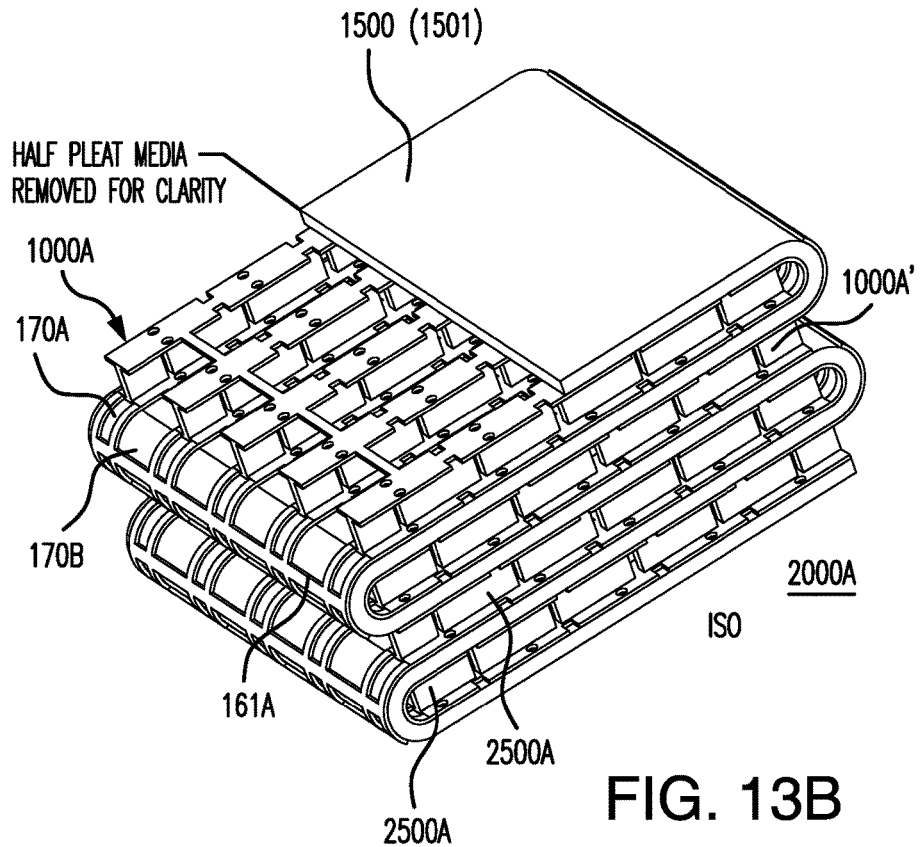

FIG. 13A shows a sectional view of an embodiment of a filter system comprising a pleated filter having a plurality of pleats, including an embodiment of a support and drainage element system, wherein each pleat has a separate support and drainage element comprising an insert arranged upstream and downstream of the pleat; FIG. 13B shows an isometric inverted view of the filter system/support and drainage element system shown in FIG. 13A.

Figure 14:
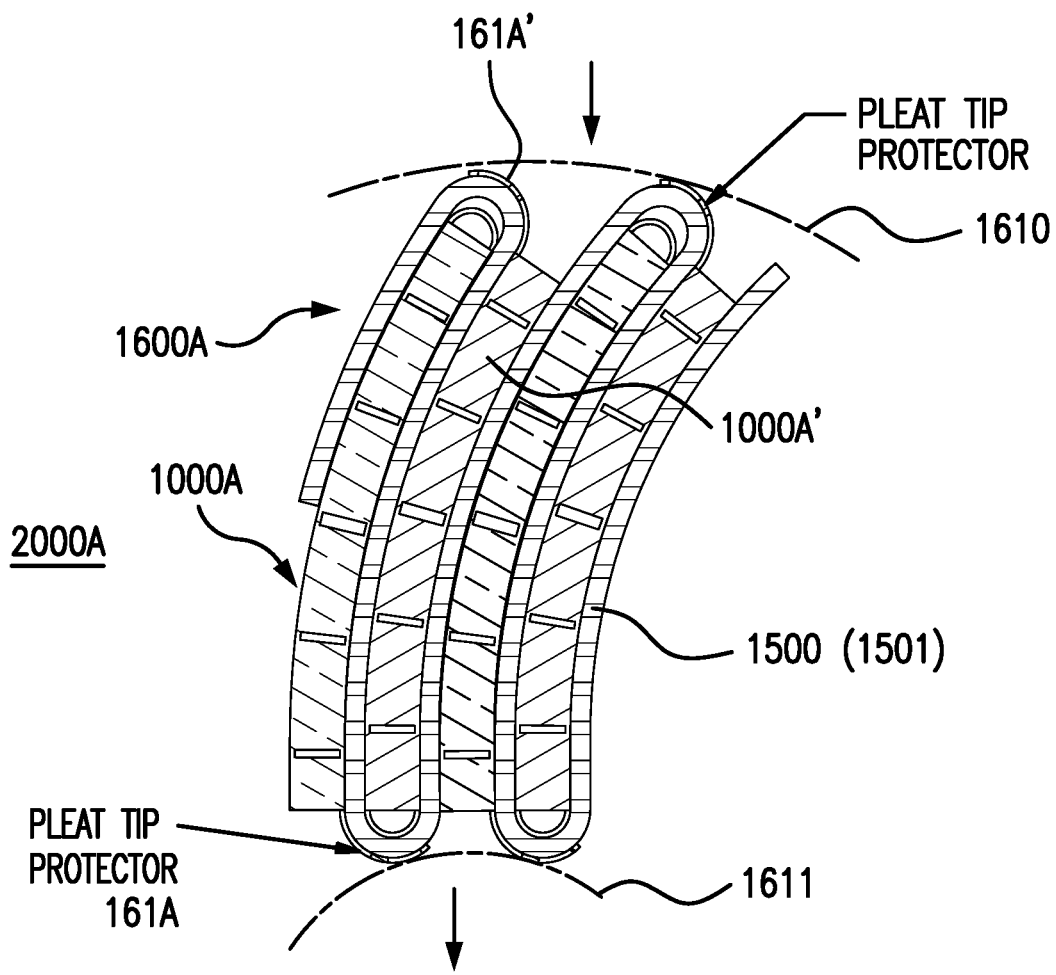

FIG. 14 shows a sectional view of the support and drainage system and the filter system as generally shown in FIG. 13B, wherein the pleated filter has a laid-over-pleat (LOP) configuration, also showing the pleated filter illustrated as a filter cartridge also comprising a filter core and an outer cage (with arrows showing the fluid flow).

DETAILED DESCRIPTION OF THE INVENTION

An embodiment of the invention provides a support and drainage element comprising a frame comprising (a) at least one first section having a first major surface and a second major surface, the first major surface and the second major surface comprising rows of parallel flanges, the rows of parallel flanges being spaced apart from each other by apertures passing through the first major surface and the second major surface, the at least one first section further comprising a plurality of apertures and/or slots passing through the parallel flanges, the at least one first section having a plurality of beams arranged in parallel and projecting upwardly from, and perpendicular to, the first major surface, wherein each beam includes at least one slot and/or aperture therethrough. In an embodiment, the support and drainage element is included in an embodiment of a support and drainage element system, wherein the system further comprises (b) at least one second section having a first major surface and a second major surface, the first major surface and the second major surface comprising rows of parallel flanges, the rows of parallel flanges being spaced apart from each other by apertures passing through the first major surface and the second major surface, the at least one second section further comprising a plurality of apertures and/or slots passing through the parallel flanges, the at least one second section having a plurality of beams arranged in parallel and projecting upwardly from, and perpendicular to, the first major surface, wherein each beam includes at least one slot and/or aperture therethrough.

In another embodiment, a support and drainage element is provided, comprising a frame comprising (a) at least one first section having a first major surface and a second major surface, the first major surface and the second major surface comprising rows of parallel flanges, the rows of parallel flanges being spaced apart from each other by apertures passing through the first major surface and the second major surface, the at least one first section further comprising a plurality of apertures and/or slots passing through the parallel flanges, the at least one first section having a plurality of beams arranged in parallel and projecting upwardly from, and perpendicular to, the first major surface, wherein each beam includes at least one slot and/or aperture therethrough; (b) at least one second section having a first major surface and a second major surface, the first major surface and the second major surface comprising rows of parallel flanges, the rows of parallel flanges being spaced apart from each other by apertures passing through the first major surface and the second major surface, the at least one second section further comprising a plurality of apertures and/or slots passing through the parallel flanges, the at least one second section having a plurality of beams arranged in parallel and projecting upwardly from, and perpendicular to, the first major surface, wherein each beam includes at least one slot and/or aperture therethrough; and (c) a first foldable hinge having a first major surface and a second major surface and at least one aperture passing through the first major surface and the second major surface, wherein the first section is connected to the second section by the first foldable hinge; (i) wherein when the first foldable hinge is folded, the plurality of beams on the first section and the plurality of beams on the second section align side by side touching each other. In an embodiment, the support and drainage element further comprises (d) at least one third section having a first major surface and a second major surface, the first major surface and the second major surface comprising rows of parallel flanges, the rows of parallel flanges being spaced apart from each other by apertures passing through the first major surface and the second major surface, the at least one third section further comprising a plurality of apertures and/or slots passing through the parallel flanges, the at least one third section having a plurality of beams arranged in parallel and projecting upwardly from, and perpendicular to, the first major surface, wherein each beam includes at least one slot and/or aperture therethrough; (e) at least one fourth section having a first major surface and a second major surface, the first major surface and the second major surface comprising rows of parallel flanges, the rows of parallel flanges being spaced apart from each other by apertures passing through the first major surface and the second major surface, the at least one fourth section further comprising a plurality of apertures and/or slots passing through the parallel flanges, the at least one fourth section having a plurality of beams arranged in parallel and projecting upwardly from, and perpendicular to, the first major surface, wherein each beam includes at least one slot and/or aperture therethrough; and (f) a second foldable hinge having a first major surface and a second major surface and an aperture passing through the first major surface and the second major surface, wherein the third section is connected to the fourth section by the second foldable hinge, and (g) a third foldable hinge having a first major surface and a second major surface and at least one aperture passing through the first major surface and the second major surface, wherein the third section is connected to the second section by the third foldable hinge; (ii) wherein when the second foldable hinge is folded, the plurality of beams on the third section and the plurality of beams on the fourth section align side by side touching each other.

Another embodiment of a support and drainage element comprises a frame comprising (a) a first section having a first major surface and a second major surface, the first major surface and the second major surface comprising rows of parallel flanges, the rows of parallel flanges being spaced apart from each other by apertures passing through the first major surface and the second major surface, the first section further comprising a plurality of apertures and/or slots passing through the parallel flanges, the at least one first section having a plurality of non-offset beams arranged in parallel and projecting upwardly from, and perpendicular to, the first major surface, wherein each beam includes at least one slot and/or aperture therethrough; the beams being connected to (b) a second section having a first major surface and a second major surface, the first major surface and the second major surface comprising rows of parallel flanges, the rows of parallel flanges being spaced apart from each other by apertures passing through the first major surface and the second major surface, the second section further comprising a plurality of apertures and/or slots passing through the parallel flanges; the support and drainage element further comprising parallel rows of spaced apart curved connectors each having a first major surface and a second major surface and at least one aperture passing through the first major surface and the second major surface, wherein a first section is connected to a second section by the curved connectors.

In some embodiments, the support and drainage element further comprises a curved extension connected to the at least one first section and/or the at least one second section, the curved extension including a plurality of apertures.

In some embodiments, the support and drainage element, when folded, the plurality of beams on the first section contact the first major surface of the second section, the plurality of beams on the second section contact the first major surface of the first section, the plurality of beams on the third section contact the first major surface of the fourth section, and the plurality of beams on the fourth section contact the first major surface of the third section.

Embodiments of the support and drainage element can include at least one additional first section, at least one additional second section, and at least one additional first foldable hinge connecting the at least one additional first section to the at least one additional second section, and at least one additional third foldable hinge, connecting the additional first section to the at least one fourth section.

A filter arrangement according to an embodiment of the invention comprises a pleated porous filter medium having a plurality of pleats, each pleat having an upstream surface and a downstream surface; and, an embodiment of the support and drainage element system, wherein the first section or the second section contacts the upstream surface or the downstream surface of a pleat, and the plurality of beams on the first section and the plurality of beams on the second section align side by side touching each other.

A filter arrangement according to another embodiment of the invention comprises a pleated porous filter medium having an upstream surface and a downstream surface and having a plurality of pleats, each pleat having an upstream surface and a downstream surface; and, at least one support and drainage element according to an embodiment of the invention, wherein the first foldable hinge is folded and the upstream surface or the downstream surface of a pleat is in contact with the second major surface of the first section and the second major surface of the second section.

In another embodiment, a support and drainage element system is provided, comprising first and second separate support and drainage elements according to an embodiment of the invention, the first separate support and drainage element comprising an upstream support and drainage element, the second separate support and drainage element comprising a downstream support and drainage element.

In yet another embodiment, a support and drainage element system comprises a plurality of first and second separate support and drainage elements according to an embodiment of the invention, each of the plurality of first and second separate support and drainage elements comprising a separate insert suitable for use upstream and/or downstream of an individual pleat of a pleated porous filter medium having a plurality of pleats.

A filter system according to an embodiment of the invention comprises a pleated porous filter comprising at least one pleated porous filter medium having a plurality of pleats, and an embodiment of the support and drainage element system, wherein the pleated porous filter is arranged between the upstream support and drainage element and the downstream support and drainage element.

A filter system according to another embodiment of the invention comprises a pleated porous filter comprising a pleated porous filter medium having a plurality of pleats, and an embodiment of the support and drainage element system, wherein each pleat has a separate support and drainage element comprising an insert arranged upstream and downstream of the pleat.

Embodiments of methods of filtering fluid are also provided, wherein the method comprises passing a fluid through an embodiment of the filter system, including passing fluid through the upstream support and drainage element, the pleated porous filter, and the downstream support and drainage element, or passing a fluid through an embodiment of the filter system, including passing fluid through the upstream support and drainage element inserts, the pleats, and the downstream support and drainage element inserts.

Advantageously, the support and drainage materials, when placed between layers of filter media (pleated or non-pleated), provide support and uniform spacing (including reducing or preventing nesting wherein strands of mesh on opposing surfaces fit between one another rather than to lie atop one another), while exhibiting reduced edgewise flow resistance (such that the pressure drop in the support and drainage material is less than the pressure drop across the filter element), thereby providing an even distribution of fluid across the surface of the filter element and reduced face loss. For example, it may be possible to reduce edgeflow resistance (as compared to filters with conventional support and drainage materials) by a factor of about two, or more.

When used with a pleated filter, they can reduce filter media damage (especially membrane damage) and allow more uniform flow distribution (including flow through the pleated tip of the filter), and provide a stable pleat-pack. Additionally, support and drainage materials including hinges are compatible with conventional pleating devices.

Furthermore, when used with a pleated filter, the use of single support and drainage inserts between pleats can lead to an overall thinner pleat pitch, allowing more filter material in a given volume, while maintaining a desirable pressure differential, and improving filtration efficiency.

Each of the components of the invention will now be described in more detail below, wherein like components have like reference numbers. Where upstream and downstream S&D materials are each illustrated with the same components, the corresponding components are identified with similar reference numbers, followed by (e.g., 100' corresponds to 100; 200' corresponds to 200; 1000' corresponds to 1000; 100A' corresponds to 100A; 200A' corresponds to 200A, 1000A' corresponds to 1000A, etc.).

In the exemplary embodiment illustrated in FIG. 1 (wherein certain components are shown in more detail in FIGS. 2-6), the support and drainage element 1000 comprises a frame 500 comprising a plurality of first sections 100 each having a first major surface 101 and a second major surface 102, the first major surface and the second major surface comprising rows 120 of parallel flanges 130 connected by lateral cross-members 135, the rows of parallel flanges being spaced apart from each other by apertures 140 passing through the first major surface and the second major surface, each first section 100 further comprising a plurality of apertures 131 and/or slots 132 passing through the parallel flanges 130, each first section 100 having a plurality of beams 150 (offset beams 150A, 150B) arranged in parallel and projecting upwardly from, and perpendicular to, the first major surface, wherein each beam includes at least one slot 151 and/or aperture therethrough; a plurality of second sections 200 each having a first major surface 201 and a second major surface 202, the first major surface and the second major surface comprising rows 220 of parallel flanges 230 connected by lateral cross-members 235, the rows of parallel flanges being spaced apart from each other by apertures 240 passing through the first major surface and the second major surface, each second section 200 further comprising a plurality of apertures 231 and/or slots 232 passing through the parallel flanges 230, each second section having a plurality of beams 250 (offset beams 250A, 250B) arranged in parallel and projecting upwardly from, and perpendicular to, the first major surface, wherein each beam includes at least one slot 251 and/or aperture therethrough; and parallel rows of first foldable hinges 600 each having a first major surface 601 and a second major surface 602 and at least one aperture 631 passing through the first major surface and the second major surface, the hinges 600 being spaced apart from each other by apertures 640 passing through the first major surface and the second major surface (apertures 640 typically being larger than apertures 631), wherein a first section 100 is connected to a second section 200 by the first foldable hinge; wherein when the first foldable hinge 600 is folded (as shown in FIG. 8, see also, FIGS. 9, 11A, and 11B), the plurality of beams 150 on the first section and the plurality of beams 250 on the second section align side by side touching each other (providing an "I-beam" appearance).

In the embodiment shown in FIG. 1, the support and drainage element 1000 further comprises a plurality of third sections 300 each having a first major surface 301 and a second major surface 302, the first major surface and the second major surface comprising rows 320 of parallel flanges 330 connected by lateral cross-members 335, the rows of parallel flanges being spaced apart from each other by apertures 340 passing through the first major surface and the second major surface, each third section further comprising a plurality of apertures 331 and/or slots 332 passing through the parallel flanges, each third section having a plurality of beams 350 (offset beams 350A, 350B) arranged in parallel and projecting upwardly from, and perpendicular to, the first major surface, wherein each beam includes at least one slot 351 and/or aperture therethrough; a plurality of fourth sections 400 each having a first major surface 401 and a second major surface 402, the first major surface and the second major surface comprising rows 420 of parallel flanges 430 connected by lateral cross-members 435, the rows of parallel flanges being spaced apart from each other by apertures 440 passing through the first major surface and the second major surface, each fourth section further comprising a plurality of apertures 431 and/or slots 432 passing through the parallel flanges, each fourth section having a plurality of beams 450 (offset beams 450A, 450B) arranged in parallel and projecting upwardly from, and perpendicular to, the first major surface, wherein each beam includes at least one slot 451 and/or aperture therethrough; and parallel rows of second foldable hinges 700 each having a first major surface 701 and a second major surface 702 and at least one aperture 731 passing through the first major surface and the second major surface, the hinges 700 being spaced apart from each other by apertures 740 passing through the first major surface and the second major surface (apertures 740 typically being larger than apertures 731), wherein a third section is connected to a fourth section by the second foldable hinge, and parallel rows of third foldable hinges 800 each having a first major surface 801 and a second major surface 802 and at least one aperture 831 passing through the first major surface and the second major surface, the hinges 800 being spaced apart from each other by apertures 840 passing through the first major surface and the second major surface (apertures 840 typically being larger than apertures 831), wherein a third section is connected to a second section by the third foldable hinge; wherein when the second foldable hinge is folded (as shown in FIG. 8), the plurality of beams 350 on the third section and the plurality of beams 450 on the fourth section align side by side touching each other.

While these illustrated embodiments include individual lateral cross-members (e.g., 135, 235, 335, 435), in some embodiments (e.g., as shown in FIG. 12C), two or more cross-members, separated by an aperture, can be utilized, e.g., for increased lateral stability.

If desired, one or more, or all, of the sections can have a tapered configuration, e.g., the difference in thickness between surfaces 101 and 102 can be less at one end of section 100 than at the other end of the section (not shown).

It should be clear that while the embodiment illustrated in FIG. 1 shows more than one of each of the first, second, third, and fourth sections, embodiments of the invention can have one of each of the first, second, third, and fourth sections, or any combinations of numbers of any of the sections, e.g., the number(s) of one section do not have to equal the number(s) of any of the other sections. Additionally, as will be discussed in more detail below, in some embodiments of the invention, the support and drainage element lacks hinges.

Typically, the number of first sections will equal the number of second sections, and the number of third sections will equal the number of fourth sections. Using the embodiment illustrated in FIGS. 1 and 8-10 for reference, typically, in those embodiments wherein one or more support and drainage elements are arranged (upstream and/or downstream) with a pleated porous filter, wherein FIGS. 9A-C and 10 shows a filter with two pleats, the support and drainage element will be extended in length repeating the arrangement of sections as shown in FIG. 1 for the additional pleats. Thus, the support and drainage element would include at least one additional first section, at least one additional second section, and at least one additional first foldable hinge connecting an additional first section to an additional second section, and at least one additional third foldable hinge, connecting the additional first section to the terminal fourth section 400 shown in FIG. 1, and an additional third section would be connected to an additional first section by still another third foldable hinge, etc.

In the embodiment illustrated in FIG. 1, the first hinge 600 and the second hinge 700 are shorter than the third hinge 800, and apertures 631 and 731 are smaller than aperture 831, but in some embodiments, the hinges and apertures are equal in size. As will be discussed in more detail below, in some embodiments, wherein one or more support and drainage elements are arranged (upstream and/or downstream) with a pleated porous filter, a foldable hinge can provide pleat root support (when folded inwardly, see, for example, FIG. 11C) and/or a foldable hinge can provide pleat tip protection (when folded outwardly, see, for example, FIG. 11B), while the aperture(s) in the hinges allow fluid flow the pleat roots and/or pleat tips.

Typically, each section has at least one row comprising at least two beams attached to a row of flanges (a flange is preferably at least twice the width of the web of the beam), wherein the beams are offset, such that when the support and drainage element is folded, the sides of one set of beams in one section contact the sides of another set of beams in another section (e.g., one side of beams 150A contacts one side of beams 250B, and one side of beams 150B contacts one side of beams 250A, the tips of the beams on one section contacting the first major surface of the other section, e.g., FIGS. 11A and 11B show one side of beam 350A contacting one side of beam 450B), providing extra stability. Preferably, each section has at least two parallel rows of offset beams spread across the width of the frame, thus preventing or minimizing the possibility of lateral shifting of the sections when the support and drainage element is folded. The number of rows and spacing can be adjusted by one of skill in the art depending on, for example, the filter media strength, differential pressure, and flow.

If desired, the beams can include apertures and/or slots. Preferably, as shown in the illustrated embodiments, the beams include one or more vertical slots, thus providing improved longitudinal flexibility and allowing the support and drainage element to take on curved shapes, e.g., laid-over pleats.

Embodiments of the support and drainage elements can be arranged upstream and/or downstream of a porous filter comprising at least one porous filter element. In some embodiments, the support and drainage elements comprise a support and drainage element system, comprising an upstream support and drainage element and a downstream support and drainage element.

Illustratively, FIGS. 9A and 10 show a filter system 2000 comprising a pleated porous filter 1500 comprising at least one pleated porous filter element, arranged between a downstream support and drainage element 1000 (as generally shown in FIG. 1) and an upstream support and drainage element 1000' (similar to that shown in FIG. 1), comprising a support and drainage element system 2500.

FIGS. 12A-12C, 13A-13B, and 14 (collectively referred to as FIGS. 12-14), illustrate support and drainage elements according to another embodiment of the invention, wherein the support and drainage elements comprise individual inserts arranged upstream and/or downstream of individual pleats of a pleated filter. FIGS. 13A-13B, and 14 also illustrate embodiments of support and drainage element systems 2500A, and filter systems 2000A, including embodiments of the support and drainage elements comprising individual inserts.

Figure 5:
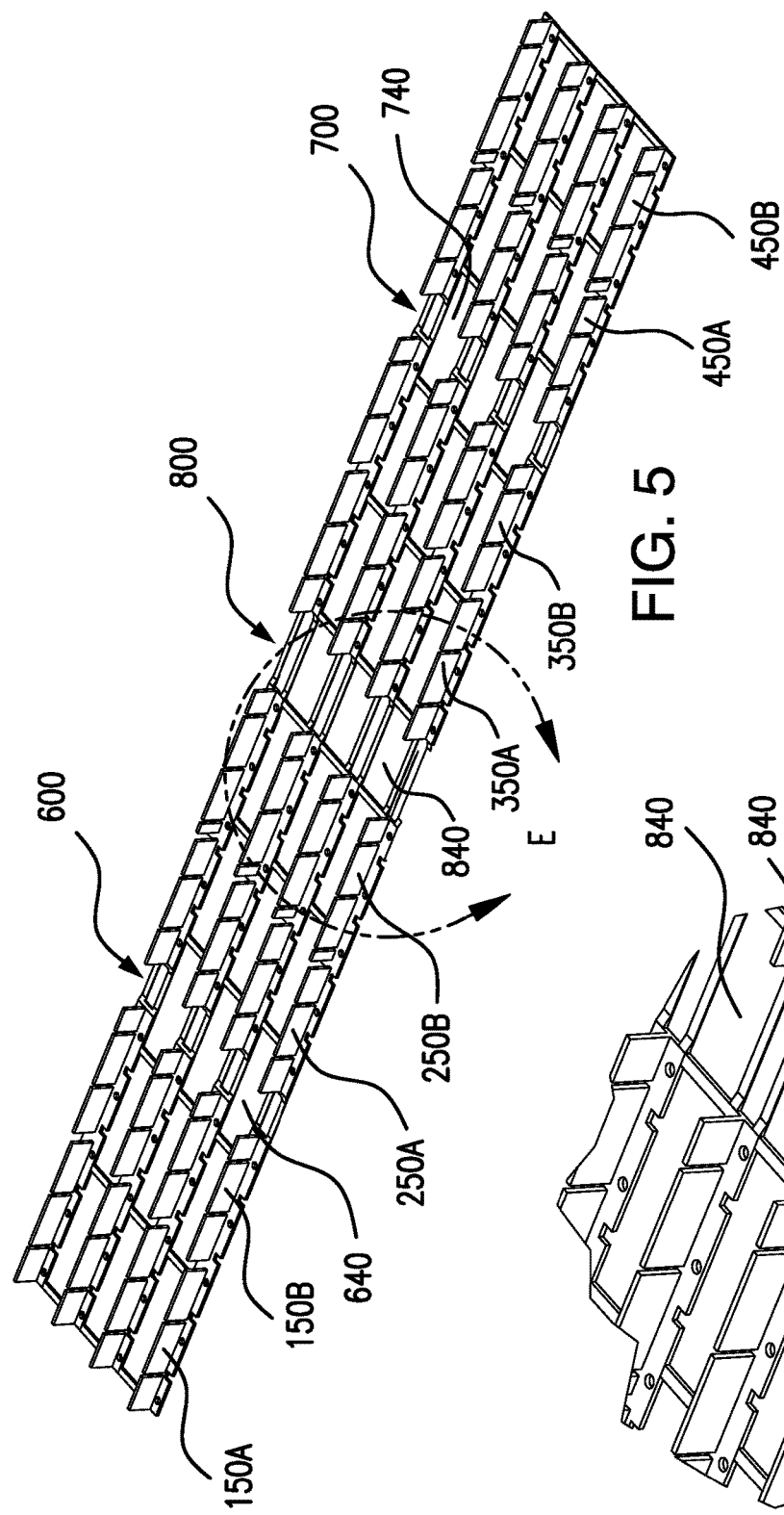
FIG. 5 is an orthogonal view of the embodiment of the support and drainage element shown in FIG. 1, showing upwardly projecting offset beams in the third and fourth sections.
Figure 6:
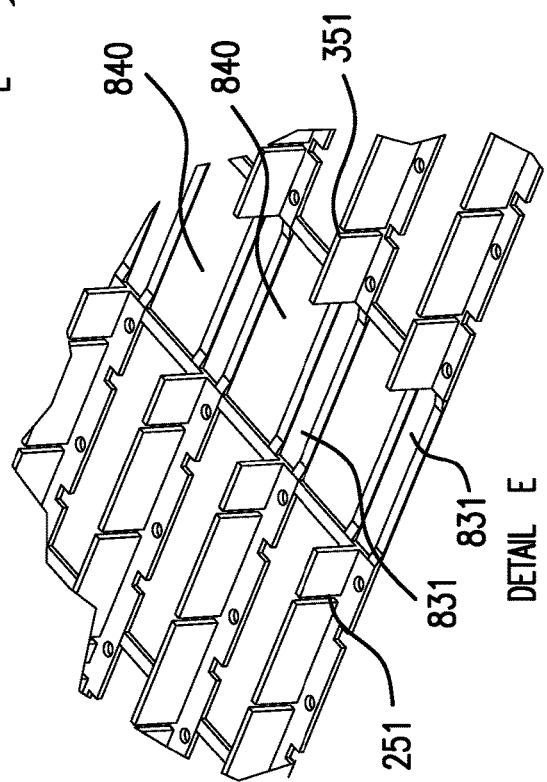
FIG. 6 is a view of detail E of the embodiment of the support and drainage element shown in FIG. 5, showing part of a third section connected to part of a fourth section by a second foldable hinge, the sections having offset beams.

In contrast with, for example, the embodiments shown in FIGS. 1, 5, and 8, having foldable hinges, as well as first sections 100 and second sections 200, each having offset beams, so that once folded, the sides of one set of beams in one section contact the sides of another set of beams in another section, the embodiments of the inserts, while having a general appearance similar to a first section 100 folded over to contact a second section 200, have only one common set of non-offset beams connecting the two sections, formed as a single solid piece, wherein the sections are also connected by connectors, rather than foldable hinges.

In the following discussion of the inserts, the embodiment will be described, for simplicity, as having first sections comprising beams, and second sections without beams. However, since the inserts have a common set of beams, it should be clear that either section, or both sections can have beams.

In the embodiments illustrated in FIGS. 12-14, the support and drainage element 1000A comprises a frame 500A comprising a plurality of first sections 100A each having a first major surface 101A and a second major surface 102A, the first major surface and the second major surface comprising rows 120A of parallel flanges 130A connected by lateral cross-members 135A, the rows of parallel flanges being spaced apart from each other by apertures 140A passing through the first major surface and the second major surface, each first section 100A further comprising a plurality of apertures 131A and/or slots 132A passing through the parallel flanges 130A, each first section 100A having a plurality of non-offset beams 150 arranged in parallel and projecting upwardly from, and perpendicular to, the first major surface, wherein each beam includes at least one slot 151A and/or aperture therethrough; a plurality of second sections 200A each having a first major surface 201A and a second major surface 202A, the first major surface and the second major surface comprising rows 220A of parallel flanges 230A (see, FIG. 12A) connected by lateral cross-members 235A, the rows of parallel flanges being spaced apart from each other by apertures 240A passing through the first major surface and the second major surface, each second section 200A further comprising a plurality of apertures 231A and/or slots 232A passing through the parallel flanges 230A, and parallel rows of curved connectors 900A each having a first major surface 901A and a second major surface 902A and at least one aperture 931A passing through the first major surface and the second major surface, the curved connectors 900A being spaced apart from each other by apertures 940A passing through the first major surface and the second major surface (apertures 940A typically being larger than apertures 931A), wherein an end of first section 100A is connected to an end of second section 200A by the connectors 900A; wherein, as shown in, for example, FIG. 13B, the plurality of beams 150 connecting the first sections and the second sections provide an "I-beam" appearance. With the exception of curved extension or end 161A (discussed below), the first sections 100A and the second sections 200A have similar structures, identified as "1A" (first sections) and "2A" (second sections).

In the embodiments illustrated in FIGS. 12-14, one end of the support and drainage element includes a curved extension or end 161A including a plurality of apertures 170 (illustrated as 170A and 170B, wherein 170B is larger than 170A). As shown in, for example. FIGS. 13A, 13B, and 14, the curved extension can provide pleat tip protection, while allowing fluid flow through.

FIGS. 13 and 14 illustrate embodiments of support and drainage element systems 2500A, and filter systems 2000A, including embodiments of the support and drainage elements 1000A, 1000a' comprising individual inserts, arranged upstream and downstream of a pleated porous filter 1500 comprising a pleated porous filter element 1501.

Embodiments with support and drainage materials comprising continuous configurations (e.g., as shown in FIG. 11C) or inserts (e.g., as shown in FIG. 13B) are particularly suitable for LOP filter configurations (as described in, for example, U.S. Pat. No. 5,543,047). For example, FIG. 14 shows an embodiment of a filter cartridge 1600A comprising an outer filter cage 1610, an inner core 1611, and a LOP filter 1500 comprising a pleated filter medium 1501, and embodiments of individual support and drainage materials 1000A, 1000A' (inserts) as generally shown in FIGS. 12A-12C, (wherein the first support and drainage elements 1000A and the second support and drainage materials 1000A' are rotated 180 degrees with respect to each other (providing an embodiment of a S&D element system 2500A)) arranged between each pleat of the pleated filter, such that both sides of each insert element contact a face of each filter pleat, and the curved extension or end 161A, 161A' of the respective insert contacts the inner surface of the cage or the inner surface of the inner core, spacing the pleat tip or pleat root away from the cage or core, thus protecting the pleat tip or pleat root, while allowing fluid flow therethrough.

The support and drainage material can be fabricated from any suitable material which is suitable for the fluid being filtered and for the applicable filtration parameters such as temperature.

The support and drainage materials can be produced by a variety of methods known in the art, including, for example, additive manufacturing (sometimes referred to as "additive layer manufacturing" or "3D printing").

The porous filter and porous filter element (e.g., membrane and/or fibrous medium, or composite) can have any suitable pore structure, e.g., a pore size (for example, as evidenced by bubble point, or by KL as described in, for example, U.S. Pat. No. 4,340,479, or evidenced by capillary condensation flow porometry), a mean flow pore (MFP) size (e.g., when characterized using a porometer, for example, a Porvair Porometer (Porvair plc, Norfolk, UK), or a porometer available under the trademark POROLUX (Porometer.com; Belgium)), a pore rating, a pore diameter (e.g., when characterized using the modified OSU F2 test as described in, for example, U.S. Pat. No. 4,925,572), or removal rating media. The pore structure used depends on the size of the particles to be utilized, the composition of the fluid to be treated, and the desired effluent level of the treated fluid.

The filter element and/or filter can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472, 621, and 6,074,869. The surface characteristics of the element can be modified (e.g., to affect the CWST, to include a surface charge, e.g., a positive or negative charge, and/or to alter the polarity or hydrophilicity of the surface) by a variety of methods known in the art.

The filter can include additional elements, layers, or components, that can have different structures and/or functions, e.g., prefiltration upstream of the filter media and/or cushioning (cushioning upstream of the filter media for damage protection or cushioning downstream of the filter media for damage protection and/or media support).

In accordance with embodiments of the invention, the filter, and/or filter element can have a variety of configurations, including planar, pleated, and hollow cylindrical.

Exemplary filters and filter elements, including pleated filters, are disclosed in U.S. Pat. Nos. 5,543,047 and 5,552, 048.

The filter, in some embodiments comprising a plurality of filter elements is typically disposed in a housing comprising at least one inlet and at least one outlet and defining at least one fluid flow path between the inlet and the outlet, wherein the filter is across the fluid flow path, to provide a filter device. The filter device can be sterilizable. Any housing of suitable shape and providing at least one inlet and at least one outlet may be employed.

The housing can be fabricated from any suitable rigid impervious material, including any impervious thermoplastic material, which is compatible with the fluid being processed. For example, the housing can be fabricated from a metal, such as stainless steel, or from a polymer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A support and drainage element comprising a frame comprising:
   (a) at least one first section having a first major surface and a second major surface, the first major surface of the at least one first section and the second major surface of the at least one first section comprising rows of parallel flanges, the rows of parallel flanges being spaced apart from each other by apertures passing through the first major surface of the at least one first section and the second major surface of the at least one first section, the at least one first section further comprising a plurality of apertures and/or slots passing through the parallel flanges of the at least one first section, the at least one first section having a plurality of beams arranged in parallel and projecting upwardly from, and perpendicular to, the first major surface of the at least one first section, wherein each beam of the plurality of beams of the at least one first section includes at least one slot and/or aperture therethrough;
(b) at least one second section having a first major surface and a second major surface, the first major surface of the at least one second section and the second major surface of the at least one second section comprising rows of parallel flanges, the rows of parallel flanges of the at least one second section being spaced apart from each other by apertures passing through the first major surface of the at least one second section and the second major surface of the at least one second section, the at least one second section further comprising a plurality of apertures and/or slots passing through the parallel flanges of the at least one second section, the at least one second section having a plurality of beams arranged in parallel and projecting upwardly from, and perpendicular to, the first major surface of the at least one second section, wherein each beam of the plurality of beams of the at least one second section includes at least one slot and/or aperture therethrough; and
(c) a first foldable hinge having a first major surface and a second major surface and at least one aperture passing through the first major surface of the first foldable hinge and the second major surface of the first foldable hinge, wherein the at least one first section is connected to the second section by the first foldable hinge;
  (i) wherein when the first foldable hinge is folded, the plurality of beams on the at least one first section and the plurality of beams on the at least one second section align side by side touching each other.

2. The support and drainage element of claim 1, further comprising
(d) at least one third section having a first major surface and a second major surface, the first major surface of the at least one third section and the second major surface of the at least one third section comprising rows of parallel flanges, the rows of parallel flanges of the at least one third section being spaced apart from each other by apertures passing through the first major surface of the at least one third section and the second major surface of the at least one third section, the at least one third section further comprising a plurality of apertures and/or slots passing through the parallel flanges of the at least one third section, the at least one third section having a plurality of beams arranged in parallel and projecting upwardly from, and perpendicular to, the first major surface of the at least one third section, wherein each beam of the plurality of beams of the at least one third section includes at least one slot and/or aperture therethrough;
(e) at least one fourth section having a first major surface and a second major surface, the first major surface of the at least one fourth section and the second major surface of the at least one fourth section comprising rows of parallel flanges, the rows of parallel flanges being spaced apart from each other by apertures passing through the first major surface of the at least one fourth section and the second major surface of the at least one fourth section, the at least one fourth section further comprising a plurality of apertures and/or slots passing through the parallel flanges of the at least one fourth section, the at least one fourth section having a plurality of beams arranged in parallel and projecting upwardly from, and perpendicular to, the first major surface of the at least one fourth section, wherein each beam of the plurality of beams of the at least one fourth section includes at least one slot and/or aperture therethrough; and
(f) a second foldable hinge having a first major surface and a second major surface and an aperture passing through the first major surface of the second foldable hinge and the second major surface of the second foldable hinge, wherein the at least one third section is connected to the at least one fourth section by the second foldable hinge, and
(g) a third foldable hinge having a first major surface and a second major surface and at least one aperture passing through the first major surface of the third foldable hinge and the second major surface of the third foldable hinge, wherein the third section is connected to the at least one second section by the third foldable hinge;
  (ii) wherein when the second foldable hinge is folded, the plurality of beams on the at least one third section and the plurality of beams on the at least one fourth section align side by side touching each other.

3. The support and drainage element of claim 2, wherein the at least one aperture in the third foldable hinge is larger than the at least one aperture in the first foldable hinge and in the second foldable hinge.

4. The support and drainage element of claim 2, wherein, when folded, the plurality of beams on the at least one first section contact the first major surface of the at least one second section, the plurality of beams on the at least one second section contact the first major surface of the at least one first section, the plurality of beams on the at least one third section contact the first major surface of the at least one fourth section, and the plurality of beams on the at least one fourth section contact the first major surface of the at least one third section.

5. The support and drainage element of claim 2, including at least one additional first section, at least one additional second section, and at least one additional first foldable hinge connecting the at least one additional first section to the at least one additional second section, and at least one additional third foldable hinge, connecting the at least one additional first section to the at least one fourth section.

6. A filter arrangement comprising:
a pleated porous filter medium having a plurality of pleats, each pleat having an upstream surface and a downstream surface; and,
a support and drainage system comprising
a support and drainage element comprising a frame comprising:
(a) at least one first section having a first major surface and a second major surface, the first major surface of the at least one first section and the second major surface of the at least one first section comprising rows of parallel flanges, the rows of parallel flanges of the at least one first section being spaced apart from each other by apertures passing through the first major surface of the at least one first section and the second major surface of the at least one first section, the at least one first section further comprising a plurality of apertures and/or slots passing through the parallel flanges of the at least one first section, the at least one first section having a plurality of beams arranged in parallel and projecting upwardly from, and perpendicular to, the first major surface of the at least one first section, wherein each beam of the plurality of beams of the at least one first section includes at least one slot and/or aperture therethrough; and
(b) at least one second section having a first major surface and a second major surface, the first major surface of the at least one second section and the second major surface of the at least one second section comprising rows of parallel flanges, the rows of parallel flanges of the at least one second section being spaced apart from each other by apertures passing through the first major surface of the at least one second section and the second major surface of the at least one second section, the at least one second section further comprising a plurality of apertures and/or slots passing through the parallel flanges of the at least one second section, the at least one second section having a plurality of beams arranged in parallel and projecting upwardly from, and perpendicular to, the first major surface of the at least one second section, wherein each beam of the plurality of beams of the at least one second section includes at least one slot and/or aperture therethrough;
wherein the at least one first section or the at least one second section contacts the upstream surface or the downstream surface of a pleat, and the plurality of beams on the at least one first section and the plurality of beams on the at least one second section align side by side touching each other.

7. A filter arrangement comprising:
a pleated porous filter medium having a plurality of pleats, each pleat having an upstream surface and a downstream surface; and,
at least one support and drainage element comprising a frame comprising:
(a) at least one first section having a first major surface and a second major surface, the first major surface and the second major surface comprising rows of parallel flanges, the rows of parallel flanges of the at least one first section being spaced apart from each other by apertures passing through the first major surface of the at least one first section and the second major surface of the at least one first section, the at least one first section further comprising a plurality of apertures and/or slots passing through the parallel flanges of the at least one first section, the at least one first section having a plurality of beams arranged in parallel and projecting upwardly from, and perpendicular to, the first major surface, wherein each beam of the plurality of beams of the at least one first section includes at least one slot and/or aperture therethrough;
(b) at least one second section having a first major surface and a second major surface, the first major surface of the at least one second section and the second major surface of the at least one second section comprising rows of parallel flanges, the rows of parallel flanges of the at least one second section being spaced apart from each other by apertures passing through the first major surface of the at least one second section and the second major surface of the at least one second section, the at least one second section further comprising a plurality of apertures and/or slots passing through the parallel flanges of the at least one second section, the at least one second section having a plurality of beams arranged in parallel and projecting upwardly from, and perpendicular to, the first major surface of the at least one second section, wherein each beam of the plurality of beams of the at least one second section includes at least one slot and/or aperture therethrough; and
(c) a first foldable hinge having a first major surface and a second major surface and at least one aperture passing through the first major surface of the first foldable hinge and the second major surface of the first foldable hinge, wherein the at least one first section is connected to the at least one second section by the first foldable hinge;
(i) wherein when the first foldable hinge is folded, the plurality of beams on the at least one first section and the plurality of beams on the at least one second section align side by side touching each other;
wherein the first foldable hinge is folded and the upstream surface or the downstream surface of a pleat is in contact with the second major surface of the at least one first section and the second major surface of the at least one second section.

8. The filter arrangement of claim 7, further comprising an additional support and drainage element comprising a frame comprising:
(a) at least one first section of the additional support and drainage element having a first major surface and a second major surface, the first major surface of the at least one first section of the additional support and drainage element and the second major surface of the at least one first section of the additional support and drainage element comprising rows of parallel flanges, the rows of parallel flanges of the at least one first section of the additional support and drainage element being spaced apart from each other by apertures passing through the first major surface of the at least one first section of the additional support and drainage element and the second major surface of the at least one first section of the additional support and drainage element, the at least one first section of the additional support and drainage element further comprising a plurality of apertures and/or slots passing through the parallel flanges of the at least one first section of the additional support and drainage element, the at least one first section of the additional support and drainage element having a plurality of beams arranged in parallel and projecting upwardly from, and perpendicular to, the first major surface, wherein each beam of the plurality of beams of the at least one first section of the additional support and drainage element includes at least one slot and/or aperture therethrough;
(b) at least one second section of the additional support and drainage element having a first major surface and a second major surface, the first major surface of the at least one second section of the additional support and drainage element and the second major surface of the at least one second section of the additional support and drainage element comprising rows of parallel flanges, the rows of parallel flanges of the at least one second section of the additional support and drainage element being spaced apart from each other by apertures passing through the first major surface of the at least one second section of the additional support and drainage element and the second major surface of the at least one second section of the additional support and drainage element, the at least one second section of the additional support and drainage element further comprising a plurality of apertures and/or slots passing through the parallel flanges of the at least one second section of the additional support and drainage element, the at least one second section of the additional support and drainage element having a plurality of beams arranged in parallel and projecting upwardly from, and perpendicular to, the first major surface of the at least one second section of the additional support and drainage element, wherein each beam of the plurality of beams of the at least one second section of the additional support and drainage element includes at least one slot and/or aperture therethrough; and (c) a first foldable hinge having a first major surface and a second major surface and at least one aperture passing through the first major surface of the first foldable hinge of the additional support and drainage element and the second major surface of the first foldable hinge of the additional support and drainage element, wherein the at least one first section of the additional support and drainage element is connected to the at least one second section of the additional support and drainage element by the first foldable hinge of the additional support and drainage element;

(i) wherein when the first foldable hinge of the additional support and drainage element is folded, the plurality of beams on the at least one first section of the additional support and drainage element and the plurality of beams on the at least one second section of the additional support and drainage element align side by side touching each other;

wherein the upstream surface of a pleat is in contact with the second major surface of the at least one first section of the additional support and drainage element and the second major surface of the at least one second section of the additional support and drainage element of the at least one support and drainage element, and the downstream surface of a pleat is in contact with the second major surface of the at least one first section of the additional support and drainage element and the second major surface of the at least one second section of the additional support and drainage element.

9. The filter arrangement of claim 7, comprising a plurality of separate support and drainage elements, the plurality of separate support and drainage elements each comprising a frame comprising:

(a) at least one first section of the plurality of separate support and drainage elements having a first major surface and a second major surface, the first major surface of the at least one first section of the plurality of separate support and drainage elements and the second major surface of the at least one first section of the plurality of separate support and drainage elements comprising rows of parallel flanges, the rows of parallel flanges of the at least one first section of the plurality of separate support and drainage elements being spaced apart from each other by apertures passing through the first major surface of the at least one first section of the plurality of separate support and drainage elements and the second major surface of the at least one first section of the plurality of separate support and drainage elements, the at least one first section of the plurality of separate support and drainage elements further comprising a plurality of apertures and/or slots passing through the parallel flanges of the at least one first section of the plurality of separate support and drainage elements, the at least one first section of the plurality of separate support and drainage elements having a plurality of beams arranged in parallel and projecting upwardly from, and perpendicular to, the first major surface, wherein each beam of the plurality of beams of the at least one first section of the plurality of separate support and drainage elements includes at least one slot and/or aperture therethrough;

(b) at least one second section of the plurality of separate support and drainage elements having a first major surface and a second major surface, the first major surface of the at least one second section of the plurality of separate support and drainage elements and the second major surface of the at least one second section of the plurality of separate support and drainage elements comprising rows of parallel flanges, the rows of parallel flanges of the at least one second section of the plurality of separate support and drainage elements being spaced apart from each other by apertures passing through the first major surface of the at least one second section of the plurality of separate support and drainage elements and the second major surface of the at least one second section of the plurality of separate support and drainage elements, the at least one second section of the plurality of separate support and drainage elements further comprising a plurality of apertures and/or slots passing through the parallel flanges of the at least one second section of the plurality of separate support and drainage elements, the at least one second section of the plurality of separate support and drainage elements having a plurality of beams arranged in parallel and projecting upwardly from, and perpendicular to, the first major surface of the at least one second section of the plurality of separate support and drainage elements, wherein each beam of the plurality of beams of the at least one second section of the plurality of separate support and drainage elements includes at least one slot and/or aperture therethrough; and (c) a first foldable hinge having a first major surface and a second major surface and at least one aperture passing through the first major surface of the first foldable hinge of the plurality of separate support and drainage elements and the second major surface of the first foldable hinge of the plurality of separate support and drainage elements, wherein the at least one first section of the plurality of separate support and drainage elements is connected to the second section of the plurality of separate support and drainage elements by the first foldable hinge of the plurality of separate support and drainage elements;

(i) wherein when the first foldable hinge of the plurality of separate support and drainage elements is folded, the plurality of beams on the at least one first section of the plurality of separate support and drainage elements and the plurality of beams on the at least one second section of the plurality of separate support and drainage elements align side by side touching each other; each of the plurality of separate support and drainage elements comprising an insert upstream and/or downstream of a pleat.

10. A support and drainage element system, comprising first and second separate support and drainage elements of claim 1, the first separate support and drainage element comprising an upstream support and drainage element, the second separate support and drainage elements comprising a downstream support and drainage element.

11. A support and drainage element system, comprising a plurality of first and second separate support and drainage elements of claim 1, each of the plurality of first and second separate support and drainage elements comprising a separate insert suitable for use upstream and/or downstream of an individual pleat of a pleated porous filter medium having a plurality of pleats.

12. A filter system comprising a pleated porous filter comprising at least one pleated porous filter medium having a plurality of pleats, and the support and drainage element system of claim 10, wherein the pleated porous filter is arranged between the upstream support and drainage element and the downstream support and drainage element.

13. A filter system comprising a pleated porous filter comprising a pleated porous filter medium having a plurality of pleats, and the support and drainage element system of claim 11, wherein each pleat has a separate support and drainage element comprising an insert arranged upstream and downstream of the pleat.

14. The filter system of claim 12, wherein the pleated porous filter comprises a laid-over-pleat filter.

15. A method of filtering fluid, the method comprising passing a fluid through the filter system of claim 12, including passing fluid through the upstream support and drainage element, the pleated porous filter, and the downstream support and drainage element.

16. A method of filtering fluid, the method comprising passing a fluid through the filter system of claim 13, including passing fluid through the upstream support and drainage element inserts, the pleats, and the downstream support and drainage element inserts.

* * * * *